US009640332B2

United States Patent
Gardner et al.

(10) Patent No.: US 9,640,332 B2
(45) Date of Patent: May 2, 2017

(54) HYBRID ELECTROCHEMICAL CAPACITOR (71) Applicant: Intel Corporation, Santa Clara, CA (US)

(72) Inventors: Donald S. Gardner, Los Altos, CA (US); Chunlei Wang, Pembroke Pines, FL (US); Yang Liu, Santa Clara, CA (US); Zhaohui Chen, San Jose, CA (US); Charles W. Holzwarth, San Jose, CA (US); Bum Ki Moon, Gilroy, CA (US)

(73) Assignee: Intel Corporation, Santa Clara, CA (US)

(*) Notice: Subject to any disclaimer, the term of this patent is extended or adjusted under 35 U.S.C. 154(b) by 366 days.

(21) Appl. No.: 14/136,933

(22) Filed: Dec. 20, 2013

(65) Prior Publication Data

US 2015/0179356 A1 Jun. 25, 2015

(51) Int. Cl.
- H01G 11/32 (2013.01)
- H01G 11/30 (2013.01)
- H01G 11/04 (2013.01)
- H01G 11/06 (2013.01)
- H01G 11/24 (2013.01)

(Continued)

(52) U.S. Cl.
CPC ............ *H01G 11/30* (2013.01); *H01G 11/04* (2013.01); *H01G 11/24* (2013.01); *H01G 11/46* (2013.01); *H01G 11/62* (2013.01); *Y02E 60/13* (2013.01)

(58) Field of Classification Search
CPC ........ H01G 11/32; H01G 11/30; H01G 11/04; H01G 11/06
See application file for complete search history.

(56) References Cited

U.S. PATENT DOCUMENTS 4,985,317 A * 1/1991 Adachi .................. C01B 25/45
 429/319
5,251,614 A * 10/1993 Cathignol .............. G10K 15/06
 601/4

(Continued)

FOREIGN PATENT DOCUMENTS

EP 1185991 B1 10/2012
JP H10-321481 A 12/1998

(Continued)

OTHER PUBLICATIONS

Chou, S., Wang, Y., Xu, J., Wang, J., Liu, H. Kun. & Dou, S. Xue. (2013). A hybrid electrolyte energy storage device with high energy and long life using lithium anode and MnO2 nanoflake cathode. Electrochemistry Communications, 31 35-38.*

(Continued)

*Primary Examiner* — Nathan Milakovich
(74) *Attorney, Agent, or Firm* — Thorpe North & Western, LLP; David W. Osborne (57) ABSTRACT

Hybrid electrochemical capacitors, electronic devices using such capacitors, and associated methods are disclosed. In an example, a hybrid electrochemical capacitor can include a first electrode made from Mg, Na, Zn, Al, Sn, or Li, a second electrode made from a porous material such as porous carbon or passivated porous silicon, and an electrolyte. The hybrid electrochemical capacitors can have enhanced voltage and energy density compared to other electrochemical capacitors, and enhanced power density compared to batteries.

27 Claims, 4 Drawing Sheets (51) Int. Cl.
*H01G 11/46* (2013.01)
*H01G 11/62* (2013.01)

(56) References Cited

U.S. PATENT DOCUMENTS

| | | | | |
|---|---|---|---|---|
| 6,468,684 B1* | 10/2002 | Chisholm | B01D 53/228 | 204/295 |
| 6,768,631 B2* | 7/2004 | Uehara | C01B 31/12 | 361/502 |
| 7,282,295 B2* | 10/2007 | Visco | H01M 2/1673 | 29/623.1 |
| 7,576,971 B2* | 8/2009 | Lipka | H01G 11/36 | 361/502 |
| 8,313,723 B2* | 11/2012 | Istvan | D01F 9/20 | 423/447.1 |
| 8,735,003 B2* | 5/2014 | Kim | H01M 4/505 | 427/115 |
| 2003/0059684 A1* | 3/2003 | Takami | H01M 4/381 | 429/326 |
| 2007/0215841 A1* | 9/2007 | Ford | B82Y 30/00 | 252/503 |
| 2009/0053512 A1* | 2/2009 | Pyun | G11B 5/712 | 428/336 |
| 2009/0068553 A1* | 3/2009 | Firsich | D21H 13/50 | 429/122 |
| 2009/0191449 A1* | 7/2009 | Yoshida | H01M 4/242 | 429/94 |
| 2009/0253025 A1* | 10/2009 | Whitacre | H01G 11/06 | 429/50 |
| 2010/0163791 A1* | 7/2010 | Fukui | C01B 33/20 | 252/182.1 |
| 2010/0220429 A1* | 9/2010 | Norieda | H01G 11/42 | 361/502 |
| 2010/0266907 A1* | 10/2010 | Yazami | H01M 4/368 | 429/405 |
| 2011/0043968 A1* | 2/2011 | Kim | H01G 11/46 | 361/528 |
| 2011/0051322 A1* | 3/2011 | Pushparaj | C23C 16/24 | 361/525 |
| 2011/0200848 A1* | 8/2011 | Chiang | B60L 11/1875 | 429/4 |
| 2012/0293912 A1 | 11/2012 | Kim et al. | | |
| 2013/0136996 A1* | 5/2013 | Lee | H01M 4/386 | 429/231.8 |
| 2013/0224394 A1* | 8/2013 | Hanbuecken | B82Y 10/00 | 427/510 |
| 2013/0273261 A1* | 10/2013 | Gardner | H01G 11/26 | 427/560 |
| 2013/0330617 A1* | 12/2013 | Yoshimura | H01G 11/32 | 429/211 |
| 2014/0170465 A1* | 6/2014 | Visco | H01G 11/06 | 429/144 |
| 2014/0335918 A1* | 11/2014 | Gardner | H01G 11/02 | 455/572 |
| 2015/0002985 A1* | 1/2015 | Holzwarth | H01G 11/26 | 361/502 |
| 2015/0004457 A1* | 1/2015 | Visco | H01M 6/34 | 429/119 |
| 2015/0004464 A1* | 1/2015 | Okuno | H01M 2/18 | 429/143 |
| 2015/0049414 A1* | 2/2015 | Gardner | H01G 11/26 | 361/502 |
| 2015/0092318 A1* | 4/2015 | Zhaohui | H01G 11/04 | 361/502 |
| 2015/0162641 A1* | 6/2015 | Visco | H01M 10/056 | 429/246 |
| 2015/0236389 A1* | 8/2015 | West | H01M 16/00 | 429/7 |
| 2015/0295216 A1* | 10/2015 | Okuno | H01M 2/1653 | 320/128 |
| 2015/0380176 A1* | 12/2015 | Seo | H01G 11/06 | 361/502 |
| 2016/0156065 A1* | 6/2016 | Visco | H01M 10/0562 | 429/322 |

FOREIGN PATENT DOCUMENTS

| | | | | |
|---|---|---|---|---|
| KR | 10-1199538 B1 | 11/2012 | | |
| WO | WO 2012112120 A1 * | 8/2012 | | H01G 9/2031 |
| WO | WO 2015150784 A1 * | 10/2015 | | H01M 4/485 |

OTHER PUBLICATIONS

Decaux et al, "Electrochemical Performance of a Hybrid Lithium-Ion Capacitor with a Graphite Anode Preloaded from Lithium Bis (Trifluoromethane) Sulfonimide-based Electrolyte", Electrochimica Acta, 2012, vol. 86, pp. 282-286.

Schroeder et al, "On the Use of Soft Carbon and Propylene Carbonate-Based Electrolytes in Lithium-Ion Capacitors", Journal of the Electrochemical Society, 2012, vol. 159, No. 8, pp. A1240-A1245.

* cited by examiner

*All data lie nearly on top of each other because there was no appreciable change from Cycle 10 to Cycle 50

FIG. 5A

*All data lie nearly on top of each other because there was no appreciable change from Cycle 10 to Cycle 50

FIG. 5B

HYBRID ELECTROCHEMICAL CAPACITOR

TECHNICAL FIELD

Embodiments described herein relate generally to energy storage devices, and relate more particularly to batteries and capacitors.

BACKGROUND

Modern society depends on the ready availability of energy. As the demand for energy increases, devices capable of efficiently storing energy become increasingly important. As a result, energy storage devices, including batteries, capacitors, electrochemical capacitors (ECs), hybrid ECs, and the like are used extensively in the electronics realm and beyond. In particular, capacitors are widely used for applications ranging from electrical circuitry and power delivery to voltage regulation and battery replacement.

Electrochemical capacitors (including pseudocapacitors and electric double-layer capacitors (EDLCs) (sometimes called ultracapacitors, among other names) are characterized by high energy storage capacity, rapid charge/discharge ability, and large cycle lifetimes, as well as other desirable characteristics including high power density, small size, and low weight, and have thus become promising candidates for use in several energy storage applications. One difference between electrochemical capacitors and batteries is that electrochemical capacitors can be charged and discharged quickly because they do not rely on chemical reactions to store energy, and they don't degrade significantly over their lifetime, even when charged and discharged rapidly. Electrochemical capacitors are also less sensitive to temperature than batteries. Hybrid ECs combine high power, fast charging capability, and long cycle life with higher voltages that increase the energy density over conventional EC capacitors. Hybrid ECs thus bridge the gap between traditional electrochemical capacitors and batteries in that they have higher power density than Li-ion batteries and higher energy density than EC capacitors. Also, hybrid capacitors can achieve efficiencies of 95% or more which is greater than the 70% efficiency exhibited by many batteries.

BRIEF DESCRIPTION OF THE DRAWINGS

Disclosed embodiments will be apparent from the detailed description which follows, taken in conjunction with the accompanying drawings, which together illustrate, by way of example, various features; and, wherein.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the figures are not necessarily drawn to scale. For example, the dimensions of some of the elements in the figures may be exaggerated relative to other elements to help improve understanding of the embodiments illustrated. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

Reference will now be made to the exemplary embodiments illustrated, and specific language will be used herein to describe the same. It will nevertheless be understood that no limitation is thereby intended.

DESCRIPTION OF EMBODIMENTS

Although the following detailed description contains many specifics for the purpose of illustration, a person of ordinary skill in the art will appreciate that many variations and alterations to the following details are within the scope of the herein disclosed invention embodiments.

Accordingly, the following invention embodiments are set forth without any loss of generality to, and without imposing limitations upon, any claims set forth herein. Before any invention embodiments are described in greater detail, it is to be understood that this disclosure is not limited to the particular invention embodiments described. It is also to be understood that the terminology used herein is for the purpose of describing particular invention embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a porous material" includes a plurality of such materials.

In this disclosure, "comprises," "comprising," "containing" and "having" and the like can have the meaning ascribed to them in U.S. patent law and can mean "includes," "including," and the like, and are generally interpreted to be open ended terms. The term "consisting of" is a closed term, and includes only the components, structures, steps, or the like specifically listed, and that which is in accordance with U.S. patent law. "Consisting essentially of" or "consists essentially" or the like, when applied to methods and compositions refers to compositions like those disclosed herein, but which may contain additional structural groups, composition components or method steps. Such additional structural groups, composition components or method steps, etc., however, do not materially affect the basic and novel characteristic(s) of the compositions or methods, compared to those of the corresponding compositions or methods disclosed herein. In further detail, "consisting essentially of" or "consists essentially" or the like, when applied to methods and compositions disclosed herein have the meaning ascribed in U.S. patent law and the term is open-ended, allowing for the presence of more than that which is recited (e.g., trace contaminants, components not reactive with porous silicon substrate, and the like) so long as basic or novel characteristics of that which is recited is not changed by the presence of more than that which is recited, but excludes prior art embodiments. When using an open ended term, like "comprising" or "including," it is understood that direct support should be afforded also to "consisting essentially of" language as well as "consisting of" language as if stated explicitly.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous.

As used herein, "electrolyte" and "ion containing electrolyte" may be used interchangeably and include solid electrolytes, gel electrolytes, ionic liquids, and liquid electrolyte solutions, including aqueous based and organic based liquids unless otherwise specified.

As used herein, "substantial" and "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

The energy density of a hybrid electrochemical capacitor (EC) can be increased by increasing the electrical potential over that of a conventional EC. This can be achieved by using a high surface-area porous material for the cathode and a battery-like electrode for the anode. In one embodiment, a hybrid electrochemical capacitor comprises a first electrode that includes Mg, Na, Zn, Al, or Sn and a second electrode comprising a porous material or a nanostructure having a surface-area-to-volume ratio of at least $10\ m^2/cm^3$, along with an electrolyte and a separator. In some embodiments, the surface-area-to-volume ratio of the porous material can be from about $10\ m^2/cm^3$ to about $5000\ m^2/cm^3$; in other embodiments the ratio can be from about $100\ m^2/cm^3$ to about $2000\ m^2/cm^3$; and in other embodiments the ratio can be from about $300\ m^2/cm^3$ to about $1000\ m^2/cm^3$. In another embodiment, the first electrode comprises Mg, Na, Zn, Al, Sn, Li, pre-lithiated porous carbon, or pre-lithiated soft carbon. Porous carbon or soft carbon can also be pre-impregnated with metal ions other than Li. The second electrode can comprise porous silicon suitably passivated with a material, in some instances, a conductive material.

Hybrid ECs in accordance with certain embodiments can be integrated into silicon devices or onto packages in order to provide energy storage with rapid response. They can be used in conjunction with batteries or (potentially) to replace batteries in applications such as: power for sleep/standby modes or backup power for memory (where they can be used repeatedly due to the high cycle lifetime); quick charge, turbo mode, and camera flash; low temperature applications (operating range of −25° C. to +60° C. with less than 5% energy loss (versus 50% for batteries)); energy harvesting devices; automotive applications (emergency power (e.g., for unlocking doors or lowering windows), sufficient power density for up-hill or accelerative driving; regenerative braking provides some recharging); and others. In addition, hybrid ECs are compatible with intermittent renewable energy sources (wind-turbines, solar/photovoltaic panels, hydraulic power, wave generators, etc.). Hybrid ECs can also be used for small devices such as in wearable technology or devices for connecting a multitude of everyday objects, appliances, products, product packaging, etc. to the Internet (to form an "Internet of Things").

Figure 1:
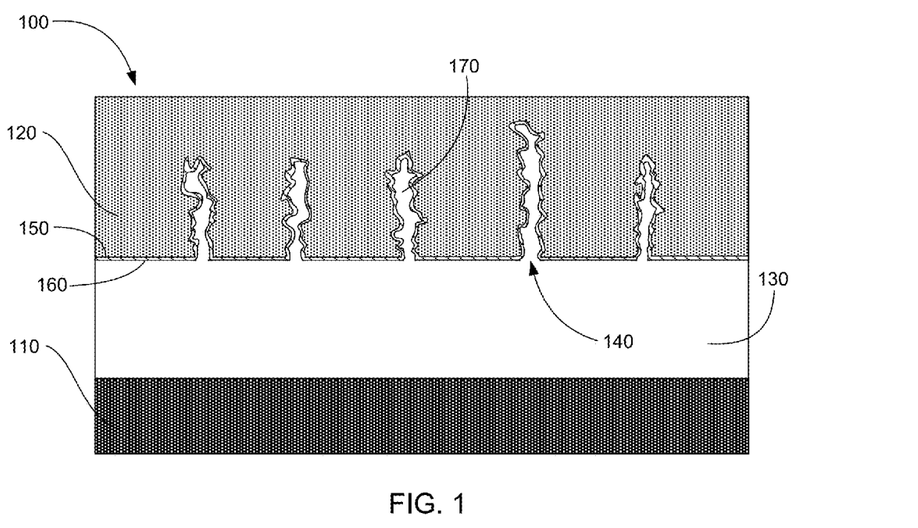
FIG. 1 is a cross-sectional view of a hybrid electrochemical capacitor in accordance with an invention embodiment.

Referring now to the drawings, FIG. 1 is a cross-sectional view of a hybrid electrochemical capacitor 100 in accordance with an invention embodiment. The hybrid EC has a first electrode 110, a second electrode 120, and an electrolyte 130. The first electrode and second electrode can be spaced apart to avoid electrical shorts between the electrodes. In some embodiments, the first electrode can comprise Mg, Na, Zn, Al, Sn, or combinations thereof, and the second electrode can comprise a porous material having a surface-area-to-volume ratio of at least 10 $m^2/cm^3$. In some embodiments, the surface-area-to-volume ratio of the porous material can be from about 10 $m^2/cm^3$ to about 5000 $m^2/cm^3$; in other embodiments the ratio can be from about 100 $m^2/cm^3$ to about 2000 $m^2/cm^3$; and in other embodiments the ratio can be from about 300 $m^2/cm^3$ to about 1000 $m^2/cm^3$. The porous material can have pores 140 opening at a surface of the electrode to allow the electrolyte to enter the pores. In some embodiments, the second electrode can have a surface 150 that is coated with a coating material 160. In some embodiments, such coating can be a conductive coating. The size of the pores and the thickness of the coating material can be configured so that inner volumes 170 of the pores are large enough for ions in the electrolyte to flow in and out.

Although FIG. 1 illustrates an embodiment in which the second electrode is a porous material and the first electrode is a nonporous material, other configurations are contemplated as well. In one embodiment, the first electrode can be an anode formed of a nonporous material and the second electrode can be a cathode formed of a porous material. However, in other embodiments, both the anode and cathode can be formed from porous materials. In still othmbodiments, the first electrode can be porous and the second electrode can be nonporous. In some embodiments, the first electrode can be the cathode and the second electrode can be the anode. In some embodiments, one or both electrodes can be coupled to a current collector (not shown).

In various embodiments, one of the electrodes in the hybrid electrochemical capacitor can operate as it would in an electric double layer capacitor (EDLC), and the other electrode can operate as it would in a battery. The EDLC-type electrode can form a double layer of charged ions on the surface of the electrode, and thereby store energy by physical electric charge storage. The battery-type electrode can chemically react with ions in the electrolyte, such as by reduction/oxidation reactions, and thereby store energy through chemical reactions. The combination of an EDLC-type electrode with a battery-type electrode allows the hybrid electrochemical capacitor to have qualities of both an EDLC and a battery. It should be noted that certain combinations of materials and operating parameters can result in hybrid electrochemical capacitors with a beneficial combination of the advantages of both EDLCs and batteries. However, many combinations of materials and operating parameters can also result in hybrid electrochemical capacitors with many of the limitations and drawbacks of EDLCs and batteries, but few of the advantages. The materials and combinations disclosed in this description and the claims can be used to make hybrid electrochemical capacitors with high energy density, high power density, and other beneficial properties.

In some embodiments, a hybrid electrochemical capacitor can have a higher voltage than conventional electrochemical capacitors. For example, in some cases the hybrid electrochemical capacitor can have a voltage of greater than 4 V. The energy density of the hybrid electrochemical capacitor is increased by increasing the electrical potential over that of an electrochemical capacitor. Also, in some embodiments the hybrid electrochemical capacitor can maintain a relatively stable voltage throughout the discharging process. For example, in some cases more than 50% of the charge stored in the hybrid electrochemical capacitor can be discharged with a voltage drop of less than 1 V. This can make the hybrid electrochemical capacitor easier to integrate into electrical systems than conventional capacitors, which drop in voltage linearly, from the maximum voltage to 0 volts, with the charge lost during the discharging process. In addition, more of the energy stored in the hybrid electrochemical capacitor can be utilized compared to a conventional capacitor, because after a conventional capacitor reaches a low voltage, such as about 1 V, the energy can no longer be realistically utilized, resulting in waste of the remaining energy.

An electrode of a hybrid electrochemical capacitor can be manufactured from various porous materials as known in the art. In one embodiment, the electrode can be manufactured from porous silicon. Other materials that can be especially well-suited for electrodes are porous germanium, porous tin, and porous titanium dioxide. Possible advantages of using porous silicon include its compatibility with existing silicon technology, inexpensive raw material, and high storage capacity. In one specific embodiment, the porous silicon can be doped. Porous germanium enjoys similar advantages as a result of existing technology for that material, high storage capacity and, as compared to silicon, enjoys the further possible advantage that its native oxide (germanium oxide) is water-soluble and so is easily removed (The native oxide that forms on the surface of silicon reduces its conductivity which is an undesirable result). Porous germanium is also highly compatible with silicon technology. However, the raw material cost of germanium is significantly more than silicon. Possible advantages of using porous tin, which is a zero-band-gap material, include its enhanced conductivity with respect to certain other conductive and semiconductive materials.

Other materials can also be well-suited for porous electrodes. For example, suitable carbon-based materials can include activated carbon, carbon nanotubes, carbon nanofibers, graphene structures, and the like. Particulate materials comprising carbon, silicon, or other materials can be used. In the case of particulate materials, it can be beneficial to hold the particles together with a conductive binder. In another embodiment, the substrate can be a nonporous material that is transformed into a porous material. Non-limiting examples of such materials can include nano- or micro-structured materials, porous etched materials, laser ablated materials, anodized materials, and the like. Suitable starting materials can include metals, semiconductors, silicon, carbon, silicon carbide, activated carbon, aluminum, and the like, including combinations thereof. Other materials can also be used for the porous structure, including alloys such as an alloy of silicon and germanium, and metals such as copper, aluminum, nickel, calcium, tungsten, molybdenum, and manganese. Further specific examples of porous materials include polycrystalline Si, metallurgical grade silicon, silicon on insulator, Si—Ge alloys, GaAs, InP, GaN, AlGaAs, and BN.

In some embodiments the porous material is a single piece. In other embodiment the porous material is comprised of an aggregate of non-porous elements (i.e. carbon nanotubes, graphene, ect.) that form a network of pores when bonded together either by a binder material or naturally occurring surface forces such as van der waals forces).

The porous electrode can operate as an electric double layer capacitor. Generally, an electrode in a double layer capacitor operates by forming a double layer of electric charge along the surface of the electrode. When the electrode is charged, ions having an opposite charge are attracted toward the surface, forming a layer. The ions remain physically adjacent to the electrode without reacting chemically with the electrode material. Therefore, the electrode surface can be inert in relation to the ions in the electrolyte in order for the electrode to operate as an electric double layer capacitor. Current commercially available EDLCs are typically carbon based, although silicon based EDLCs have recently been contemplated. Silicon based EDLCs can employ a porous silicon substrate material coated with a coating material that is conductive and inert. Since carbon is naturally conductive and highly inert, no passivation is required for carbon based electrodes and no additional layers are used. The layer of coating material in a silicon based electrode typically has only one surface that is active and the electrolyte forms a double layer on that surface. The other surface is inactive since it is in contact with the porous silicon.

Some embodiments may make use of very narrow pores in the porous material. In certain embodiments, an electrolyte is introduced into the pores. In such embodiments the size of the pores can be sufficient to allow entry of the electrolyte. Certain electrolytes may have solvated ions on the order of 2 nanometers (nm). In at least one embodiment, therefore, a smallest dimension of each one of the pores is no less than 2 nm so as to permit the electrolyte to flow freely along the entire length of the pores.

In the same or another embodiment, the smallest dimension of each one of the pores is no greater than 1 micrometer ($\mu m$). This upper size limit for the smallest dimension of the pores can be chosen for particular embodiments in order to maximize the surface area of the porous structures of those embodiments. In some embodiments, the transfer of ions from the electrolyte to the electrode material is the kinetically limiting reaction, and therefore maximizing the surface area can increase the power. Smaller (e.g., narrower) pores lead to increased overall surface area for each electrode because a larger number of such narrower pores can fit into an electrode of a given size. Further, the pores' other dimensions, e.g., their lengths and/or shapes, can also be manipulated in order to increase surface area or to achieve some other result. In embodiments where the porous electrode is an anode that operates by intercalation of ions, the increased surface area provided by the various pore sizes and configurations provides greater opportunity for intercalation of the porous material with ions and therefore a greater charge capacity. In other embodiments the smallest dimension of the pores can be larger than 1 $\mu m$, and can be up to 10 $\mu m$ or more. Although larger pores would decrease the surface area of the porous material, such larger pores can provide more interior space in which to grow or expand, or otherwise form additional structures, if needed.

Porous structures according to embodiments of the disclosure can be fabricated with very precise and uniform pore size control. This allows fast charging and also improves the capacity (pore size can be optimized for fast/efficient diffusion of ions through the pores to the maximum amount of surface area).

In some embodiments, a hybrid electrochemical capacitor can include a cathode made of a porous material that is coated with a pseudocapacitive coating material. In some cases, such as with a lithium metal anode, the capacity density of the porous cathode can be less than the capacity density of the anode. Pseudocapacitive materials can be deposited onto the cathode to increase the capacity of the cathode to more closely match the capacity of the anode. Examples of pseudocapacitive materials include without limitation $MnO_2$, $RuO_2$, $V_2O_5$, VN, VC, $Mo_2N$, $Mo_2C$, $W_2N$, $W_2C$, CrN, poly(3,4-ethylenedioxythiophene) (PEDOT), polypyrrole (PPy), poly(triaryl amine) (PTAA), polyaniline (PANI), and others. Pseudocapacitive materials can also include hydroxides.

In some embodiments, the first electrode can be an anode made from alkali or alkaline metals including Mg, Na, other metals such as Zn, Al, Sn, alloys of these materials such as $Na_2Ti_3O_7$, $Na_2Ti_6O_{13}$, Si—Sn alloys, or materials alloyed with Mg. The second electrode can be a cathode made from any porous material that can act as an EDLC-type electrode. For example, porous carbon, passivated porous Si, or a porous cathode that includes a pseudocapacitive material can be used. Other porous materials can also be prepared such as by plating a material onto porous silicon and then etching away the silicon. In one embodiment, the anode can comprise magnesium, and the cathode can be a carbon-based cathode comprising a binder and a conducting agent. In one specific embodiment, the binder can be sodium carboxymethyl-cellulose, and the conducting agent can be conductive carbon black such as SUPER C65. The electrolyte can be an electrolyte compatible with magnesium, containing Mg ions. For example, compatible electrolytes include 2-methyltetrahydrofuran with $MgBr_2$ and $Mg(OCH_2(CH_3))_2$.

Using magnesium as an anode can be beneficial for several reasons. First, magnesium does not react violently with water, as lithium does. Magnesium anodes can therefore be safer than lithium anodes, and can be used with aqueous electrolytes. Also, magnesium ions carry a charge of +2, so a magnesium anode can store twice as much charge per ion as a lithium anode. However, magnesium has a more positive potential than lithium and therefore the total voltage of a hybrid electrochemical capacitor with a magnesium anode can be less. In the past, magnesium has not been used extensively as an anode in batteries because of difficulty finding effective cathodes that are compatible with magnesium anodes. By using an EDLC-type cathode in a hybrid electrochemical capacitor with a magnesium anode, the advantages of magnesium anodes can be utilized without a need for finding a compatible battery-type cathode. Other metals such as Na, Zn, Al, or Sn can be used as anodes in the same way, with appropriate electrolytes containing ions of the respective metals.

Alternatively, the anode can comprise lithium spinel structures such as $Li_4Mn_5O_{12}$, $Li_4Ti_5O_{12}$, and $Li_2Mn_4O_9$ with a spinel-type structure. The electrical potential of these materials is not as electronegative as some other materials, but is still low. One benefit using this material is enhanced device stability and cyclability due to minimal deformation of the spinel material during operation.

Porous silicon can be used as an anode material in some embodiments. In such embodiments, the anode can be porous silicon that is pre-lithiated. In some embodiments silicon, porous silicon, or porous silicon particles in a conductive matrix, such as carbon, can be used for the anode and lithium can intercalate into the anode. Alternatively, the anode can comprise a porous transition metal nitride or oxide such as porous $TiO_2$, TiN, TaN, $Ta_xO_y$, and/or $TiO_2$ coated porous silicon which can react with lithium to form lithium titanate. The electrical potential of this material is not as low as some other anode materials, but is still low. By nano-engineering $TiO_2$, higher lithiation can be achieved to raise the energy density on the anode side. Such porous silicon anodes can be used together with cathodes made from porous silicon passivated with a suitable electrically conductive or pseudocapacative material. Also, in some embodiments, the cathode can comprise $LiMn_2O_4$, $LiCoO_2$, $LiCoPO_4$, $LiMnPO_4$, $LiNiO_2$, or combinations thereof.

In some embodiments that include porous silicon as an anode, the porous silicon anode can be manufactured to have a target porosity. Such porosity can be achieved using etching techniques, or other known techniques as known in the art. In some embodiments, the porous electrode can expand during use, such as when a porous silicon electrode is lithiated. The porosity generally allows for the expansion of the porous material during use. In one embodiment, the porosity can be determined based on the designed volume change of the system. For example, if an anode volume change is designed to be x %, then the porosity can be $1-[1/(1+(x\%/100\%))]$ or greater. In one example, the porosity can range from 25% to 80%. In one aspect, the porosity can be 50% or more. Other examples of porosity include 60% or more, 70% or more, or even 80% or more. Such porous silicon anodes can be used together with cathodes that are made from porous silicon passivated with a suitable electrically conductive material.

Figure 2:
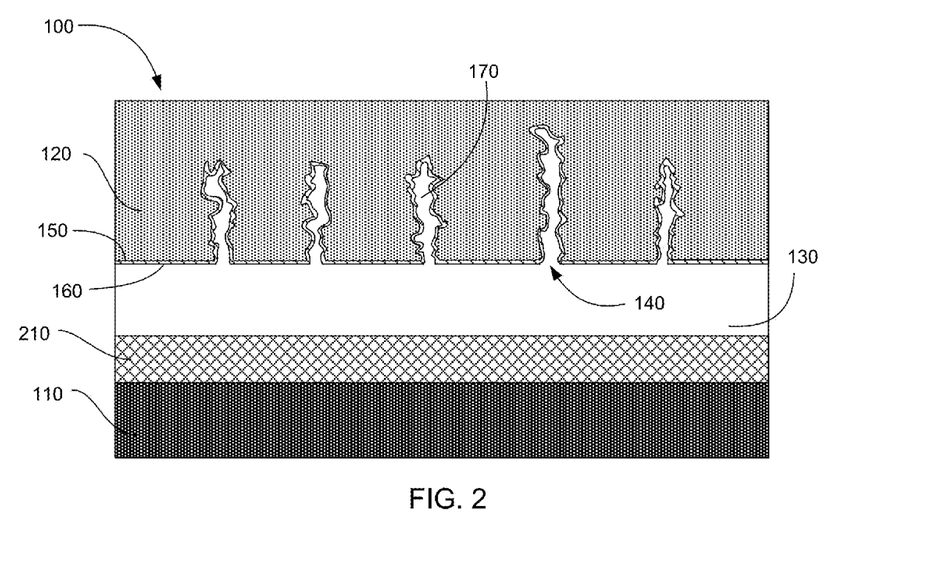
FIG. 2 is a cross-sectional view of a hybrid electrochemical capacitor in accordance with an invention embodiment.

Referring to FIG. 2, in some embodiments a hybrid electrochemical capacitor 100 can have a separator 210 between the first electrode 110 and the second electrode 120. The separator can prevent the electrodes from coming into contact with one another and causing an electrical short. The separator can also be permeable to ions in the electrolyte 130 so that the ions can flow back and forth between the electrodes. The separator can allow ions to pass through while electrically insulating the electrodes from one another (i.e., not allowing electrons to pass through). In some embodiments, the electrolyte can be an organic electrolyte and the separator can be made from a porous ceramic, a polymer film, or combinations thereof. Other examples of suitable separator materials can include without limitation cellulose, including wet-laid, PP non-woven, and microporous membrane (ePTFE or HDPE) based materials. It should be noted that a separator is not always necessary if the electrodes are positioned a sufficient distance apart from each other to prevent electrical shorts and both electrodes are compatible with the electrolyte.

In some embodiments, a solid state electrolyte can act as both an electrolyte and a separator. For example, in some cases the first electrode can comprise a reactive material such as lithium. If an aqueous electrolyte is used, then a solid state electrolyte can prevent contact between the lithium electrode and water in the aqueous electrolyte.

In some embodiments, a hybrid electrochemical capacitor can include a first electrode, a second electrode, and an electrolyte, wherein the first electrode comprises Mg, Na, Zn, Al, Sn, pre-lithiated carbon, Li, or combinations thereof; and the second electrode comprises a porous structure formed out of a group IV semiconductor, a group III-V semiconductor, or combinations thereof. For example, in one specific embodiment, the first electrode can be a lithium metal anode and the second electrode can be a cathode made of porous silicon passivated with atomic layer deposited titanium nitride (ALD TiN). The electrolyte can be an organic electrolyte solution such as a 1M solution of lithium hexafluorophosphate ($LiPF_6$) in propylene carbonate (PC) or a 1M solution of lithium perchlorate ($LiClO_4$) in PC. Other lithium salts and other organic solvents can also be used. For example, lithium salts can include lithium hexafluoroarsenate monohydrate ($LiAsF_6$), lithium tetrafluoroborate ($LiBF_4$), and lithium triflate ($LiCF_3SO_3$). Other suitable organic solvents include ethylene carbonate, (EC), diethyl carbonate (DEC), dimethyl carbonate (DMC), ethyl methylcarbonate (EMC), and acetonitrile. Other lithium-based anodes can also be used, including alloys of lithium with other materials such as $Li_4Ti_5O_{12}$ or lithium alloyed with carbon such as petroleum coke. In another specific embodiment, the anode can be $Li_4Ti_5O_{12}$ and the electrolyte can be $LiPF_6$ in ethylene carbonate and dimethyl carbonate.

In some embodiments, the hybrid electrochemical capacitor can include an electrode made of porous silicon passivated with an electrically conductive coating material. Referring again to FIG. 2, in some embodiments the second electrode 120 can include a coating material 160 that coats the surfaces 150 of the electrode that are in contact with electrolyte 130. In cases where the electrode is made of silicon, this coating material can passivate the silicon to prevent the silicon from reacting with the electrolyte. The coating material can form a layer with any desired thickness. In some embodiments, the thickness of the coating material can be less than 100 nm. In other embodiments, the thickness of the coating material can be less than 50 nm, less than 30 nm, or less than 10 nm. In some embodiments, the thickness of the coating material and the dimensions of the pores can be configured so that ions from the electrolyte can flow into and out of the interior volumes 170 of the pores.

The coating material can be an electrically conductive material. In some embodiments, the coating material can include carbon, nitride, silicide, carbide, or combinations thereof. Graphene, graphene based composites, and carbon nano-structures can be used as coating material to both boost conductivity and add surface area. As an example, these can be nanoparticles or nanowires of any suitable material (e.g., silicon or carbon) or combination of materials (e.g., silicon germanium-with either a silicon core or a germanium core), carbon nanotubes, silicon-coated carbon nanotubes, or the like. In some embodiments such nano-structures can be coated, or partially coated, with an electrically conductive or a pseudocapacitive coating. This coating can be a good electrical conductor (e.g., an appropriate metal, a silicide, or the like). At least some of the nanostructures can contain a dopant in order to further increase their electrical conductivity. Additionally, in some embodiments at least some of the nanostructures are coated with a material that prevents an electrochemical reaction between the nanostructures and the electrolyte.

Additionally, the coating material can include a pseudocapacitive material. The coating layer can be a homogeneous layer of a single material in some embodiments, while in other embodiments the coating layer can include multiple layers of different materials. For example, in some embodiments the coating layer can include a first layer of an electrically conductive material and a second layer of a pseudocapacitive material. In some embodiments, the pseudocapacitive material can be a hydroxide. Other examples of pseudocapacitive materials include $MnO_2$, $RuO_2$, $V_2O_5$, VN, VC, $Mo_2N$, $Mo_2C$, $W_2N$, $W_2C$, CrN, PEDOT, PPy, PTAA, PANI, and others.

In some embodiments, the volume of the second electrode can be greater than the volume of the first electrode. In some cases, the anode material can have significantly higher capacity than the cathode material. For example, lithium has a higher capacity density than porous silicon. Therefore, it can be beneficial to make the cathode with a larger volume than the anode to balance the capacities of the anode and cathode. In some embodiments this is achieved by anodizing deeper into the silicon or using a thicker layer of activated carbon as the cathode.

Figure 3:
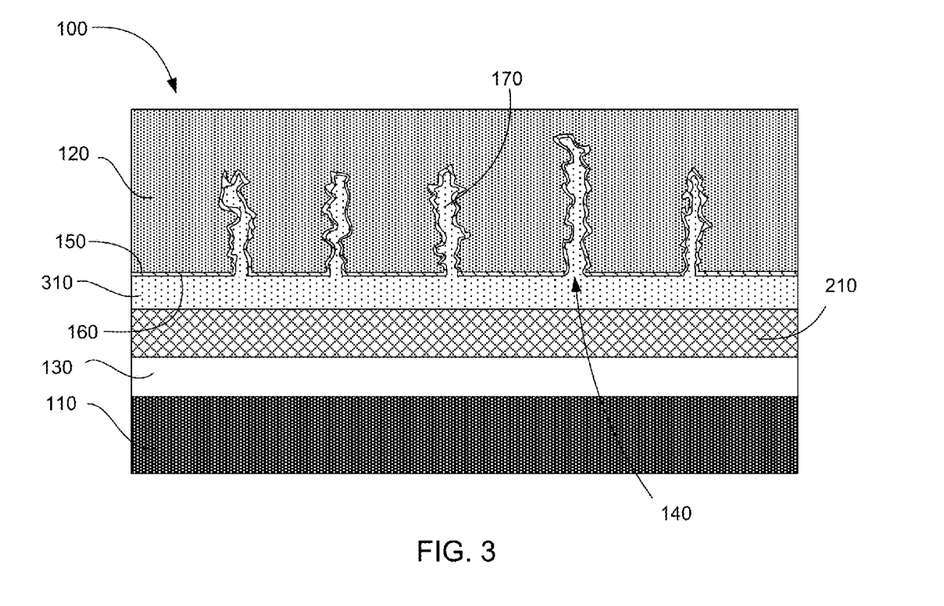
FIG. 3 is a cross-sectional view of a hybrid electrochemical capacitor in accordance with an invention embodiment.

In some embodiments, a hybrid electrochemical capacitor can include a first electrolyte and a second electrolyte. The first electrolyte can be a water-stable electrolyte, while the second electrolyte can be an aqueous electrolyte. The first electrode can be at least partially immersed in the first electrolyte, and the second electrode can be at least partially immersed in the second electrolyte. Two different electrolytes can be used in this way when the first electrode operates better in non-aqueous electrolyte and the second electrode operates better in aqueous electrolyte. For example, in embodiments with a lithium anode, the lithium can be in contact with the water-stable electrolyte, and the water-stable electrolyte can shield the lithium anode from the aqueous electrolyte so that lithium does not react with water in the aqueous electrolyte. As shown in FIG. 3, in some embodiments the electrolyte 130 can be a water-stable electrolyte in contact with the first electrode 110. The second electrolyte 310 can be an aqueous electrolyte in contact with the second electrode 120. In this way, the hybrid electrochemical capacitor can operate with two different electrolytes selected to be compatible with the two electrodes. The water-stable electrolyte can include a gel electrolyte, a solid-state electrolyte, a non-aqueous electrolyte, or combinations thereof. In some cases, two solid state electrolytes and separators may be used for cathodes and anodes selectively. For example, in some cases the solid state electrolytes can act as separators and can prevent electrical contact without the use of another separator besides the solid state electrolytes. Two different solid state electrolytes can be used where one electrolyte is more compatible with one electrode, and the other electrolyte is more compatible with the other electrode.

Another embodiment can include a mobile electronic device. The mobile electronic device can include a housing enclosing a processing unit and an energy storage device electrically connected to the processing unit to provide power to the processing unit. The energy storage device can comprise a hybrid electrochemical capacitor as described above. The hybrid electrochemical capacitor can include a first electrode, a second electrode, and an electrolyte. In some embodiments of the mobile electronic device, the first electrode can comprise Mg, Na, Zn, Al, Sn, or combinations thereof, and the second electrode can comprise a porous material having a surface-area-to-volume ratio of at least 10 $m^2/cm^3$. In some embodiments, the surface-area-to-volume ratio of the porous material can be from about 10 $m^2/cm^3$ to about 5000 $m^2/cm^3$; in other embodiments the ratio can be from about 100 $m^2/cm^3$ to about 2000 $m^2/cm^3$; and in other embodiments the ratio can be from about 300 $m^2/cm^3$ to about 1000 $m^2/cm^3$. In other embodiments of the mobile electronic device, the first electrode can comprise Mg, Na, Zn, Al, Sn, pre-lithiated carbon, Li, or combinations thereof, and the second electrode can comprise porous silicon.

In some embodiments of the mobile electronic device, at least one of the first electrode and the second electrode can comprise porous silicon, porous carbon, graphene, a carbon nanowire, a carbon nanotube, porous Germanium, porous group III-V semiconductor, porous group IV semiconductor, a pseudocapacitive material, or combinations thereof. Further, the electrodes can comprise any of the materials disclosed above for use in electrodes of hybrid electrochemical capacitors.

In other embodiments of the mobile electronic device, the electrolyte can be a water-stable electrolyte, and the hybrid electrochemical capacitor can also include a second electrolyte that comprises an aqueous electrolyte. The first electrode can be at least partially immersed in the electrolyte and the second electrode can be at least partially immersed in the second electrolyte. The water-stable electrolyte can be a gel electrolyte, a solid-state electrolyte, or a non-aqueous electrolyte. The hybrid electrochemical capacitor in the mobile electronic device can also include a separator. In some embodiments, the electrolyte can be an organic electrolyte and the separator can comprise a porous ceramic, a polymer film, or combinations thereof.

Hybrid electrochemical capacitors can be incorporated into a variety of electronic systems. For example, a hybrid electrochemical capacitor can be integrated monolithically onto a silicon substrate or package. An electronic system having a monolithically integrated hybrid electrochemical capacitor can include a semiconductor substrate, one or more electronic circuit elements, and at least one hybrid electrochemical capacitor. The electronic circuit element and the hybrid electrochemical capacitor are thus formed monolithically on the semiconductor substrate. The electronic circuit element can include any type of circuit element that can be beneficially combined with a hybrid electrochemical capacitor on a substrate. Non-limiting examples include CPUs, GPUs, control units, integrated circuits, transistor elements, diodes, photodiodes, and the like. Additionally, the monolithic substrate can include electrical circuitry that provides electrical connectivity between the hybrid electrochemical capacitor and the electronic circuit element.

Additionally, in some embodiments multiple hybrid electrochemical capacitors can be combined to form systems having enhanced electrical properties. In one aspect, for example, a high energy storage system having enhanced operation voltage is provided. Such a system can include a plurality of hybrid electrochemical capacitors as have been described, where the plurality of hybrid electrochemical capacitors are functionally coupled together in series or in parallel depending on whether higher voltage (series) or power (parallel) is desired. In some aspects such a system can be formed by bringing together hybrid electrochemical capacitors that have been manufactured as separate units. In other aspects, the hybrid electrochemical capacitors can be formed together as a system during manufacture. It is contemplated that, in such cases, various structures can be shared between the capacitors being constructed in series or parallel. For example, in one aspect a pair of adjacent hybrid electrochemical capacitors can share a double-sided electrode, or in some cases, a composite double-sided electrode.

Hybrid electrochemical capacitors can be integrated into mobile or other electronic devices to provide energy storage with rapid response. The hybrid electrochemical capacitors can be used together with batteries or potentially to replace batteries. Hybrid electrochemical capacitors can provide high power for applications such as turbo modes in microprocessors. Unlike batteries, hybrid electrochemical capacitors can be charged and discharged quickly because they do not rely on chemical reactions to store energy. Further, they do not degrade significantly over their lifetime, even when charged and discharged rapidly. Hybrid electrochemical capacitors are also less sensitive to temperature than batteries. Several applications for hybrid electrochemical capacitors in various devices include: power for sleep/standby mode or backup power for memory; quick charging of electronic devices; turbo modes; camera flashes; intermittent renewable energy sources (wind-turbines, solar/PV panels, hydraulic power, or wave generators, for example); low temperature applications (hybrid ECs can be used from −25° C. to +60° C. with less than 5% energy loss versus 50% for batteries); energy storage for energy harvesting devices; automotive applications such as regenerative braking, which provides a certain amount of recharging when the car decelerates; increased power density for up-hill or accelerative driving; providing power to unlock car doors or lower windows in an emergency; and others.

Figure 4:
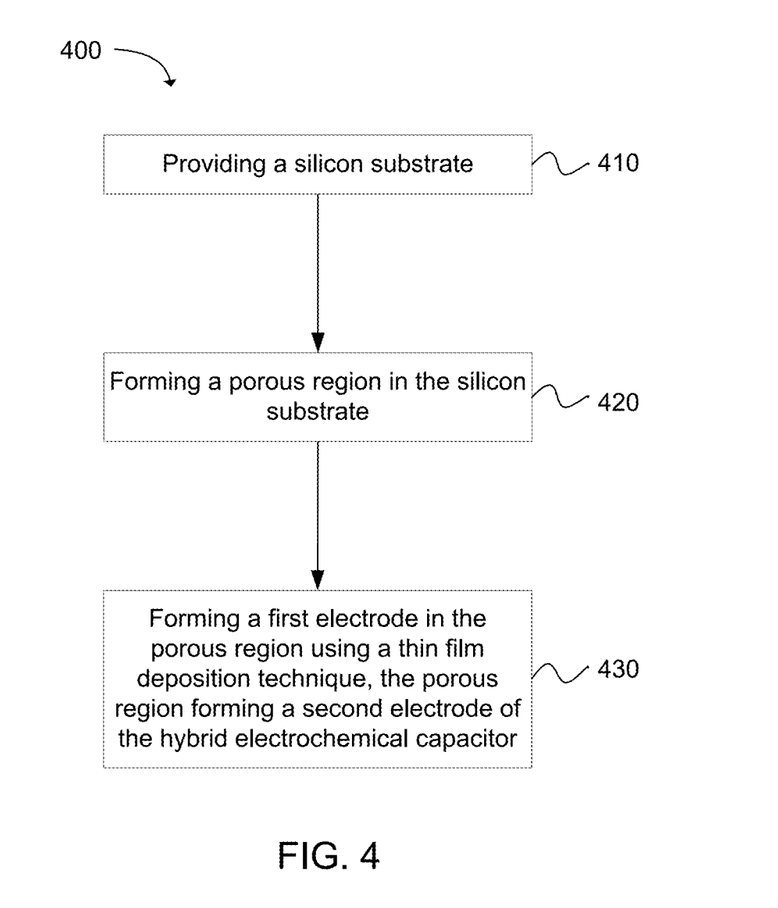
FIG. 4 is a flowchart illustrating a method of manufacturing a hybrid electrochemical capacitor in accordance with an invention embodiment.

Another embodiment can include a method of manufacturing a hybrid electrochemical capacitor. As illustrated in FIG. 4, the method 400 can include providing a silicon substrate 410, forming a porous region in the silicon substrate 420, and forming a first electrode over the porous region using a thin film deposition technique. With the first electrode deposited over the porous region, the porous region can be a second electrode of the hybrid electrochemical capacitor 430. The first electrode can be formed from any of the electrode materials disclosed above that can be deposited using a thin film deposition technique. The porous region in the silicon substrate can also be modified prior to depositing the first electrode, such as by coating the porous silicon region with a coating material as disclosed above or pre-lithiating the porous silicon region in embodiments where the porous silicon is a pre-lithiated anode. Additionally, an electrolyte of any of the types disclosed above can be deposited on the porous silicon region before forming the first electrode over the porous region. A separator can also be deposited between the porous silicon region and the first electrode.

The porous silicon region can be formed by any known method, and any such method is considered to be within the present scope. In some embodiments, for example, the porous region can be formed via a technique such as anodization, microelectromechanical systems (MEMS) processing including lithography, chemical etching, and the like, as well as other known methods. Additionally, by varying the three dimensional characteristics of the porous region, the resulting hybrid electrochemical capacitor can be optimized to achieve higher energy capacity. Through such methods, the hybrid electrochemical capacitors can be easily integrated into silicon technology and the form factor can be adjusted for use in devices such as a typical package used for microchips.

The porous silicon region can be coated with coating materials using a variety of techniques, and any known method capable of depositing such materials on a porous silicon surface is considered to be within the present scope. For example, coating materials can be deposited by a variety of non-limiting methods, including complementary metal-oxide-semiconductor (CMOS) processing methods, chemical vapor deposition (CVD), physical vapor deposition (PVD), atomic layer deposition (ALD) growth, supercritical flow growth, hydrothermal growth, electroplating, spin on for polymers, and the like. Additionally, particulate materials can be deposited onto the porous silicon by methods such as solution casting, electrophoresis, sintering, or the like.

The first electrode can be deposited over the porous region by any of the above-identified deposition techniques as well. In some embodiments, the first electrode can be an anode and can be formed from any of the anode materials disclosed above. The anode can also be a porous material that is conductive and related to heat sinking.

A porous region in the silicon substrate can be defined as any surface modification that increases the surface area of the silicon substrate. In some aspects, a silicon substrate having a porous region can have a much higher surface area as compared to a substrate lacking such porous region. It is noted that any type of structuring to any degree that increases the surface area of the silicon substrate is considered to be within the present scope. In some cases, the porous region can comprise distinct surface features that increase the surface area of the material. While such surface features can be of any size that is beneficial for use in a hybrid electrochemical capacitor, in one aspect surface features can have an average size of from about 2 nm to about 100 microns. In another aspect, surface features can have an average size of from about 2 nm to about 300 nm. In yet another aspect, surface features can have an average size of from about 2 nm to about 80 nm. Non-limiting examples of surface feature types can include pillars, tubes, trenches, cones, pyramids, walls, pores, sponges, and the like, including appropriate combinations thereof. It is noted that the measurement of average size of a given surface feature can vary depending on the feature. For example, vertically oriented surface features such as pillars, tubes, cones, and pyramids can be measured from the base to pinnacle of the feature. For pores, on the other hand, average size can be measured as an average diameter of the pore, while trenches can be measured as the trench width. In some aspects, the structured material can have a pore size of from about 30 nm to about 300 nm. It is noted that the above applies for structured surfaces on materials other than silicon as well, such as, for example, porous carbon materials.

In one example, a hybrid electrochemical capacitor can comprise a first electrode, a second electrode, and an electrolyte, wherein the first electrode comprises Mg, Na, Zn, Al, Sn, or combinations thereof, and the second electrode comprises a porous material having a surface-area-to-volume ratio of at least $10\ m^2/cm^3$.

In one example, the second electrode can comprise a porous material having a surface-area-to-volume ratio from about $10\ m^2/cm^3$ to about $5000\ m^2/cm^3$.

In one example, the second electrode can comprise a porous material having a surface-area-to-volume ratio from about $100\ m^2/cm^3$ to about $2000\ m^2/cm^3$.

In one example, the second electrode can comprise a porous material having a surface-area-to-volume ratio from about $300\ m^2/cm^3$ to about $1000\ m^2/cm^3$.

In one example, the second electrode can comprise porous carbon.

In one example, the second electrode can comprise a binder and a conducting agent.

In one example, the second electrode can be a single piece.

In one example, the second electrode can comprise a particulate material.

In on example, the particulate material can be in a binder.

In one example, the second electrode can comprise porous silicon, porous germanium, porous group III-V semiconductor, porous group IV semiconductor, graphene, a carbon nanowire, a carbon nanotube, or combinations thereof.

In one example, the second electrode can comprise a pseudocapacitive material.

In one example, the first electrode can comprise magnesium and the electrolyte can comprise Mg ions.

In one example, the hybrid electrochemical capacitor can further comprise a separator.

In one example, the separator can be a solid state electrolyte.

In one example, a hybrid electrochemical capacitor can comprise a first electrode, a second electrode, and an electrolyte, wherein the first electrode comprises Mg, Na, Zn, Al, Sn, pre-lithiated carbon, Li, or combinations thereof, and the second electrode comprises a porous structure formed out of a group IV semiconductor, a group III-V semiconductor, or combinations thereof.

In one example, the second electrode can comprise porous silicon.

In one example, the porous silicon can be coated with a coating material with a thickness less than 100 nm.

In one example, the coating material thickness can be less than 50 nm.

In one example, the coating material thickness can be less than 30 nm.

In one example, the coating material thickness can be less than 10 nm.

In one example, the coating material can be electrically conductive.

In one example, the coating material can comprise carbon, nitride, silicide, carbide, or combinations thereof.

In one example, the coating material can comprise titanium nitride.

In one example, the coating material can passivate surfaces of the porous silicon.

In one example, the coating material can be pseudocapacitive.

In one example, the pseudocapacitive coating material can comprise a hydroxide.

In one example, the second electrode can be configured to have a charge storage capacity substantially matching a charge storage capacity of the first electrode.

In one example, the hybrid electrochemical capacitor can further comprise a second electrolyte, wherein the electrolyte is a water-stable electrolyte, the second electrolyte is an aqueous electrolyte, the first electrode is at least partially immersed in the electrolyte, and the second electrode is at least partially immersed in the second electrolyte.

In one example, the electrolyte can comprise a gel electrolyte, a solid-state electrolyte, a non-aqueous electrolyte, or combinations thereof.

In one example, the electrolyte can be a non-aqueous electrolyte.

In one example, the hybrid electrochemical capacitor can further comprise a separator.

In one example, the electrolyte can be an organic electrolyte and the separator can comprise a porous ceramic, a polymer film, or combinations thereof.

In one example, a mobile electronic device can comprise a housing, a processing unit, and an energy storage device, the energy storage device comprising a hybrid electrochemical capacitor, wherein the hybrid electrochemical capacitor comprises a first electrode, a second electrode, and an electrolyte, wherein either: (1) the first electrode comprises Mg, Na, Zn, Al, Sn, or combinations thereof, and the second electrode comprises a porous material having a surface-area-to-volume ratio of at least 10 $m^2/cm^3$, or (2) the first electrode comprises Mg, Na, Zn, Al, Sn, $TiO_2$ pre-lithiated carbon, Li, or combinations thereof, and the second electrode comprises porous silicon.

In one example, at least one of the first electrode and the second electrode can comprise porous silicon, porous carbon, graphene, a carbon nanowire, a carbon nanotube, porous Germanium, porous group III-V semiconductor, porous group IV semiconductor, a pseudocapacitive material, or combinations thereof.

In one example, the electrolyte can be a water-stable electrolyte, the hybrid electrochemical capacitor can further comprise a second electrolyte, the second electrolyte comprising an aqueous electrolyte, and the first electrode can be at least partially immersed in the electrolyte and the second electrode can be at least partially immersed in the second electrolyte.

In one example, the electrolyte can comprise a gel electrolyte, a solid-state electrolyte, a non-aqueous electrolyte, or combinations thereof.

In one example, the electrolyte can be a non-aqueous electrolyte.

In one example, the mobile electronic device can further comprise a separator.

In one example, the electrolyte can be an organic electrolyte and the separator can comprise a porous ceramic, a polymer film, or combinations thereof.

In one example, a method of manufacturing a hybrid electrochemical capacitor can comprise providing a silicon substrate, forming a porous region in the silicon substrate, forming a first electrode over the porous region using a thin film deposition technique, the porous region forming a second electrode of the hybrid electrochemical capacitor.

In one example, the first electrode can comprise $LiMn_2O_4$, $LiCoO_2$, $LiCoPO_4$, $LiMnPO_4$, $LiNiO_2$, or combinations thereof, and the method can further comprise pre-lithiating the second electrode.

The described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

EXAMPLE 1

Figure 5A:
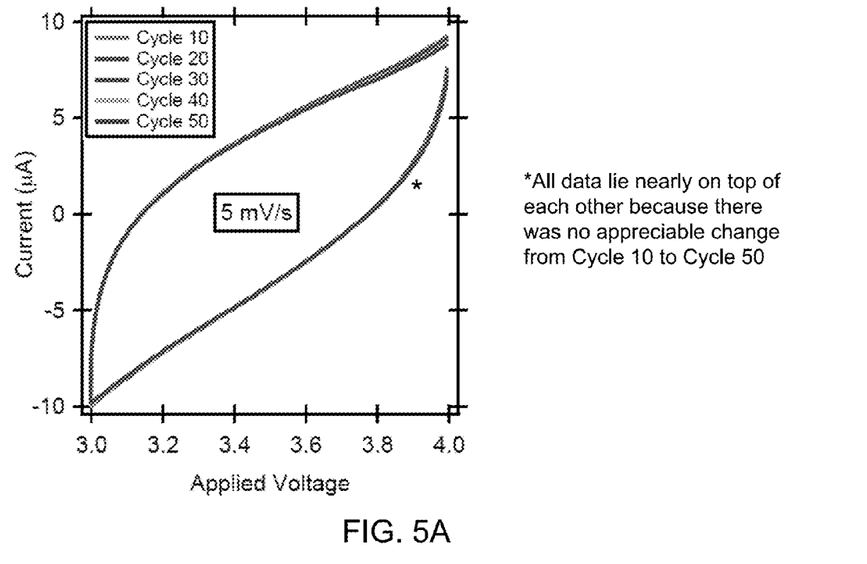
FIGS. 5A-B are charts illustrating cyclic voltammetry tests performed on a hybrid electrochemical capacitor in accordance with various invention embodiments.
Figure 5B:
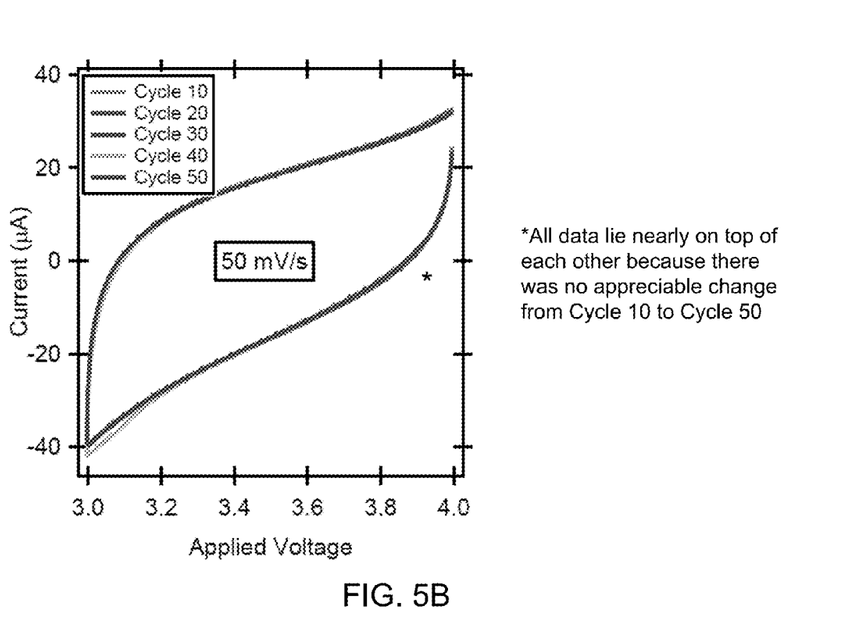

A hybrid electrochemical capacitor is prepared with a lithium metal anode and a cathode made from porous silicon passivated with ALD TiN. The electrolyte is propylene carbonate with 1M lithium perchlorate. No separator is necessary. Cyclic voltammetry measurements are shown in FIGS. 5A and 5B. Lithium is used as a reference electrode and the voltage is cycled between 3 and 4 volts. Note that the data for every cycle illustrated (i.e., cycles 10, 20, 30, 40, and 50) lie nearly on top of each other because there is no appreciable change from Cycle 10 to Cycle 50. It may be difficult to distinguish between the cycles on the graphs, but this is because the data remain nearly the same over the 50 charge cycles. The purpose of the graphs is to illustrate the stability of the hybrid electrochemical capacitor after multiple cycles. The hybrid electrochemical capacitor shows little change after 50 cycles, indicating that the electrodes have good stability. Also, during discharge almost all the charge stored in the capacitor is released before reaching 3 volts. This shows that most of the energy stored by the capacitor can be utilized before the voltage drops too low for the energy to be usable.

What is claimed is:

1. A hybrid electrochemical capacitor comprising:
a first electrode;
a second electrode; and
a first electrolyte comprising a non-aqueous electrolyte;
a second electrolyte comprising an aqueous electrolyte;
wherein:
the first electrode comprises Mg, Na, Zn, Al, Sn, TiO2 or combinations thereof; and
the second electrode comprises a porous material having a surface-area-to-volume ratio of at least 10 m2/cm3.

2. The hybrid electrochemical capacitor of claim 1, wherein the second electrode comprises a porous material having a surface-area-to-volume ratio from about 10 m2/cm3 to about 5000 m2/cm3.

3. The hybrid electrochemical capacitor of claim 1, wherein the second electrode comprises porous carbon.

4. The hybrid electrochemical capacitor of claim 3, wherein the second electrode comprises a binder and a conducting agent.

5. The hybrid electrochemical capacitor of claim 3, wherein the second electrode is a substantially solid material.

6. The hybrid electrochemical capacitor of claim 1, wherein the second electrode comprises a particulate material.

7. The hybrid electrochemical capacitor of claim 6, wherein the particulate material is in a binder.

8. The hybrid electrochemical capacitor of claim 1, wherein the second electrode comprises porous silicon, porous germanium, porous group III-V semiconductor, porous group IV semiconductor, graphene, a carbon nanowire, a carbon nanotube, or combinations thereof.

9. The hybrid electrochemical capacitor of claim 1, wherein the second electrode comprises a pseudocapacitive material.

10. The hybrid electrochemical capacitor of claim 1, wherein the first electrode comprises magnesium and the first electrolyte comprises Mg ions.

11. The hybrid electrochemical capacitor of claim 1, further comprising a separator.

12. The hybrid electrochemical capacitor of claim 1, wherein at least one of the first electrolyte and the second electrolyte is a solid state electrolyte that acts as a separator.

13. A hybrid electrochemical capacitor comprising:
   a first electrode;
   a second electrode; and
   a first electrolyte comprising a non-aqueous electrolyte;
   a second electrolyte comprising an aqueous electrolyte;
   wherein:
      the first electrode comprises Mg, Na, Zn, Al, Sn, TiO2, pre-lithiated carbon, Li, or combinations thereof; and
      the second electrode comprises a porous structure formed out of a group IV semiconductor, a group III-V semiconductor, or combinations thereof.

14. The hybrid electrochemical capacitor of claim 13, wherein the second electrode comprises porous silicon.

15. The hybrid electrochemical capacitor of claim 14, wherein the porous silicon is coated with a coating material with a thickness less than 100 nm.

16. The hybrid electrochemical capacitor of claim 15, wherein the coating material is electrically conductive.

17. The hybrid electrochemical capacitor of claim 15, wherein the coating material comprises carbon, nitride, silicide, carbide, or combinations thereof.

18. The hybrid electrochemical capacitor of claim 15, wherein the coating material comprises titanium nitride.

19. The hybrid electrochemical capacitor of claim 15, wherein the coating material passivates surfaces of the porous silicon.

20. The hybrid electrochemical capacitor of claim 15, wherein the coating material is pseudocapacitive.

21. A mobile electronic device comprising:
   a housing;
   a processing unit; and
   an energy storage device, the energy storage device comprising a hybrid electrochemical capacitor, wherein the hybrid electrochemical capacitor comprises:
   a first electrode;
   a second electrode;
   a first electrolyte comprising a non-aqueous electrolyte; and
   a second electrolyte comprising an aqueous electrolyte;
   wherein either:
      (1) the first electrode comprises Mg, Na, Zn, Al, Sn, or combinations thereof, and the second electrode comprises a porous material having a surface-area-to-volume ratio of at least 10 m2/cm3; or
      (2) the first electrode comprises Mg, Na, Zn, Al, Sn, pre-lithiated carbon, Li, or combinations thereof, and the second electrode comprises porous silicon.

22. The mobile electronic device of claim 21, wherein at least one of the first electrode and the second electrode comprises porous silicon, porous carbon, graphene, a carbon nanowire, a carbon nanotube, porous Germanium, porous group III-V semiconductor, porous group IV semiconductor, a pseudocapacitive material, or combinations thereof.

23. The mobile electronic device of claim 21, wherein:
   the first electrode is at least partially immersed in the first electrolyte and the second electrode is at least partially immersed in the second electrolyte.

24. The mobile electronic device of claim 21, wherein the first electrolyte comprises a gel electrolyte, a solid-state electrolyte, a non-aqueous electrolyte, or combinations thereof.

25. The mobile electronic device of claim 21, wherein the first electrolyte is a water-stable electrolyte.

26. The mobile electronic device of claim 21, further comprising a separator.

27. The mobile electronic device of claim 26, wherein the first electrolyte is an organic electrolyte and the separator comprises a porous ceramic, a polymer film, or combinations thereof.

* * * * *